United States Patent Office 3,775,367
Patented Nov. 27, 1973

3,775,367
FLAME RESISTANT POLYCARBONATES
Werner Nouverné, Krefeld, Germany, assignor to
Bayer Aktiengesellschaft, Leverkusen, Germany
No Drawing. Continuation-in-part of application Ser. No. 44,869, June 9, 1970. This application Nov. 3, 1971, Ser. No. 195,456
Claims priority, application Germany, June 13, 1969, P 19 30 257.9
Int. Cl. C09k 3/28
U.S. Cl. 260—45.9 R                    5 Claims

ABSTRACT OF THE DISCLOSURE

High molecular weight, thermoplastic polycarbonates of divalent phenols having improved flame resistance are provided which contain perfluoroalkane sulphonates.

This application is a continuation-in-part of application Ser. No. 44,869, filed June 9, 1970, now abandoned.

It has been proposed that flameproofing additives which are known to be suitable for use in other synthetic resins might also be added to high molecular weight thermoplastic polycarbonates prepared from divalent phenols in order to reduce their already low combustibility still further. However, attempts to carry out such a proposal have not been successful, either because the amount of such additives which had to be used in order to get some effect was so large that the valuable properties of the polycarbonates were seriously impaired, or the additives were incompatible with polycarbonates or unstable at the high processing temperatures employed for polycarbonates. Alternatively, therefore, polycarbonates having a reduced combustibility have been produced industrially by incorporating halogen-containing divalent phenols such as tetrachloro- or tetrabromo-bisphenols into the polymer molecule. This solution has not yielded entirely satisfactory results since the high halogen content thus necessitated may have an adverse effect on the polymer and interfere to some extent with the processing of the polymer. Further, in case of a fire, the halogen constituent may cause secondary damage (corrosion) to metal parts if present in the form of hydrohalic acids.

It is therefore an object of this invention to provide flameproof high molecular weight thermoplastic polycarbonates having improved flame resistance and a method for preparing them which are devoid of the foregoing disadvantages.

Another object of this invention is to provide polycarbonates having improved flame resistance the physical and chemical properties of which have not been impaired.

Yet another object of this invention is to provide a homogeneous polycarbonate composition which is stable at polycarbonate processing temperatures and which has a reduced combustibility.

Still another object of this invention is to provide polycarbonates having improved flame resistance and a method for preparing them wherein the polymer is not adversely affected nor is the process by which they are prepared interfered with due to the presence of the flame inhibitor.

The foregoing objects and others which will become apparent from the following description are accomplished in accordance with this invention, generally speaking, by providing high molecular weight thermoplastic polycarbonates having improved flame resistance which contain an effective amount of a perfluoroalkane alkali metal sulphonate or perfluoroalkane ammonium sulphonate to impart the flameproof properties to the polymer. Preferably, the perfluoroalkane alkali metal sulphonates or perfluoroalkane ammonium sulphonates contain from about four to about eight carbon atoms in the alkyl group. If desired, the polycarbonates which are flameproofed in accordance with this invention may also contain halogen atoms in their polymeric structure.

Although the flameproofing agents of this invention can be employed in any amount desired, it has generally been found that they very greatly reduce the combustibility of polycarbonates even at low concentrations so that the addition of small quantities such as from about 0.01 to about 1 percent by weight and preferably from about 0.05 to about 0.2 percent by weight based on the weight of the polycarbonate are sufficient to render polycarbonates non-flammable. The effect of the additives of this invention may be further increased, however, by incorporating halogen, e.g. chlorine or bromine, into the polycarbonate either as a halogen containing organic additive compound or as a halogen containing component of the polymeric structure, in which case the diols from which the polycarbonate is produced are halogenated in a known manner. In addition, the perfluoroalkanes of this invention are compatible with polycarbonates and stable at the elevated temperatures required for the processing of the polymer.

Any suitable perfluoroalkane alkali metal or ammonium sulphonates as described herein may be used including, for example, sodium and potassium perfluorobutane sulphonate, sodium and potassium perfluoromethylbutane sulphonate, sodium and potassium perfluorooctane sulphonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate, tetraethylammonium perfluorobutane sulphonate, tetraethylammonium perfluoromethylbutane sulphonate and the like and mixtures thereof. Such sulphonates or mixtures thereof may be added to the polycarbonate during its preparation or they may be added to the melt of the finished polycarbonate by homogenization using an extruder, for example, or by any other suitable means which will insure a thorough distribution of the additives of this invention in the polycarbonate resin. Some such suitable methods are described, for example, in U.S. Pat. 3,509,091.

It is to be understood that the polycarbonates prepared in accordance with this invention may also contain other additives such as dyes, pigments, fillers, particularly glass fibers, stabilizers, particularly against discoloration, high temperature degradation, UV radiation and oxidation, lubricants and so on. Any such additives well known in the art may thus be used including, for example, those suggested in U.S. Pat. 3,509,091.

Any polycarbonate polymer prepared by any of those techniques known in the art may be used in the polycarbonate composition of the instant claims. The polycarbonate composition can be produced from a dihydroxy diaryl alkane and phosgene or a diester of carbonic acid, for example, as described in Canadian Pats. 578,585; 578,975; 594,805; U.S. Pats. 3,028,365 and 2,999,835. Other processes contemplated for producing polycarbonates to be used in the compositions that may be stabilized in accordance with this invention include those referred to in "Polycarbonates" by William F. Christopher and Daniel W. Fox, as well as those disclosed in U.S. Pats. 2,999,846; 3,153,008; 3,215,668; 3,187,065; 2,970,131; 2,964,794; 2,991,273; 3,094,508; 3,215,667; 3,277,740; 3,248,414; 3,148,172; 3,380,965; 3,014,891; 3,320,211; 3,277,055; 3,280,078; 3,271,368; 3,271,367; 3,261,808; 3,251,803 as well as those listed elsewhere herein and so on.

The polycarbonate compositions of this invention are eminently suitable for use in any of those applications for which polycarbonates are suitable, and particularly when improved flammability is required. For example the polycarbonates stabilized in accordance with this invention may be used in the preparation of masks, interior decorative panels, structural components for airplane interiors, in electronic equipment such as for terminal blocks, helmets, wall facing or for any other suitable application.

The invention is further illustrated but is not intended to be limited by the following examples in which all parts and percentages are by weight unless otherwise specified.

EXAMPLES

To determine the reduction in combustibility, the polycarbonate melt is made up into a test sample in an injection extrusion screw and then tested by the following procedure:

Test samples measuring 120 x 10 x 4 mm. are suspended vertically and exposed to a 2 cm. high Bunsen burner flame (without an air supply). The distance of the Bunsen burner is 1 cm. The length of time is determined for which the test rod can be exposed to the flame as described above without continuing to burn for longer than 30 seconds after removal of the flame, and without burning particles dripping off of the rod and igniting a wad of cotton wool placed under the rod.

The relative viscosities shown below are measured on solutions of 0.5 g. of polycarbonate in 100 ml. of methylene chloride at 25° C.

In the following examples the following polycarbonates are used: Polycarbonate 1 is the reaction product of bisphenol A and phosgen having a relative viscosity measured as described above of 1.28. It was prepared by introducing, under nitrogen atmosphere, 1825 parts by weight of phosgen into a mixture of 3420 parts by weight of bisphenol A, 70.0 parts by weight of p-tert.butylphenol, 2100 parts by weight of a 45 percent by weight aqueous sodium anhydride solution, 17,500 parts by weight of distilled water and 33,000 parts by weight of methylene chloride at 24–25° C. During the 10th and 90th minute of the introduction period of phosgen further 1300 parts by weight of a 45 percent by weight aqueous sodium hydroxide solution were dropped in. After the introduction of the phosgen was finished 6 parts by weight of triethylamine were added and stirred for further an hour. Then the organic phase and the aqueous phase were separated. The organic phase was washed first with a 2 percent by weight aqueous phosphoric acid, second with a 2 percent by weight aqueous sodium hydroxide solution, third further two times with the 2 percent by weight phosphoric acid and finally with distilled water until the solution was neutral. Thereafter 7500 parts by weight of chlorobenzene were added to the methylene chloride solution and the main proportion of the methylene chloride was distilled off. After cooling the remaining mixture gelled. The gel was chopped to small pieces which were dried at 120° C. under vacuum during 48 hours.

The polycarbonate 2 is a branched polycarbonate of bisphenol A having a relative viscosity of 1.29 which was prepared as follows:

A mixture of 3420 parts by weight of bisphenol A, 8.7 parts by weight of 2,6-bis-(2'-hydroxy-5'-methylbenzyl)-4-methyl-phenol, 70 parts by weight of p-tert.butylphenol, 2810 parts by weight of a 45 percent by weight aqueous hydroxide solution, 17,500 parts by weight of distilled water and 33,000 parts by weight of methylene chloride was treated with phosgen and the reaction product was worked up as described above.

The polycarbonate 3 is a polycarbonate of bisphenol A having a relative viscosity of 1.28 mixed with 30 percent by weight of glass fibres based on the weight of the total mixture. This product was prepared by mixing 2100 parts by weight of the polycarbonate 1 and 900 parts by weight of glass fibres having an average fibre length of 200µ in an extruder. The melt was extruded to a bristle which was chopped to granulate.

Polycarbonate 4 is a polycarbonate of bisphenol A and tetrachlorobisphenol A having a relative viscosity of 1.27 and containing 6.5 percent by weight of chlorine. This product was prepared by treating a mixture of 2.992 parts by weight of bisphenol A, 686 parts by weight of tetrachlorobisphenol A (2,2-bis-(3,5-dichloro-4-hydroxyphenol)-propane), 50 parts by weight of p-tert.butylphenol, 2850 parts by weight of a 45 percent by weight aqueous sodium hydroxide solution, 17,500 parts by weight of distilled water and 33,000 parts by weight of methylene chloride with phosgen and by working up the reaction product as described for the polycarbonate 1.

Polycarbonate 5 is a polycarbonate of bisphenol A and tetrachlorobisphenol A having a relative viscosity of 1.28 and containing 2.5 percent by weight of chlorine. This product was prepared by mixing 1845 parts by weight of the polycarbonate 1 and 1155 parts by weight of the polycarbonate 4 in an extruder and forming a granulate from this mixture.

EXAMPLE 1

To polycarbonate 1 there were admixed 0.1 percent by weight of potassium perfluorooctane sulphonate. Test samples formed from this mixture can be exposed to the flame as described above for from 30–40 seconds.

EXAMPLE 2

The polycarbonate 1 was mixed with 0.1 percent by weight of potassium perfluorobutane sulphonate. Test samples of this mixture can be exposed to the flame for 30 seconds.

EXAMPLE 3

The polycarbonate 2 was mixed with 0.1 percent by weight of potassium perfluorooctane sulphonate. Test samples of this mixture can be exposed to the flame for 35 seconds.

EXAMPLE 4

The polycarbonate 3 was mixed with 0.1 percent by weight of potassium perfluorooctane sulphonate. Test samples of this mixture can be exposed to the flame for from 35–50 seconds.

EXAMPLE 5

The polycarbonate 4 was mixed with 0.5 percent by weight of potassium perfluorooctane sulphonate. Test samples of this mixture can be exposed to the flame for more than 60 seconds. For comparison, test samples of the polycarmonate 4 without the addition of the potassium perfluorooctane sulphonate can only be exposed to the flame for 25 seconds.

EXAMPLE 6

The polycarbonate 5 was mixed with 0.2 percent by weight of potassium perfluorooctane sulphonate. Test samples of this mixture can be exposed to the flame for from 40–60 seconds.

EXAMPLE 7

The polycarbonate 4 was mixed with 0.01 percent by weight of tetraethylammonium perfluorobutane sulphonate. Test samples of this mixture can be exposed to the flame for 30 seconds.

EXAMPLE 8

The polycarbonate 1 was mixed with 0.01 percent by weight of tetraethylammonium perfluorobutane sulphonate. Test samples of this mixture can be exposed to the flame for from 10–15 seconds.

EXAMPLE 9

For comparison with all these examples, test samples of polycarbonate 1 without any additives can only be exposed to the flame for from 5–10 seconds.

EXAMPLE 10

The polycarbonate 1 was mixed with 0.1 percent by weight of potassium perfluoromethane sulfonate. Test samples of this mixture can be exposed to the flame for from 20-25 seconds.

EXAMPLE 11

The polycarbonate 5 was mixed with 0.1 percent by weight of potassium perfluoroethane sulfonate. Test samples of this mixture can be exposed to the flame for from 30-35 seconds.

EXAMPLE 12

The polycarbonate 3 was mixed with 0.075 percent by weight of potassium perfluorohexane sulfonate. Test samples of this mixture can be exposed to the flame for from 30-35 seconds.

EXAMPLE 13

The polycarbonate 3 was mixed with 0.1 percent by weight of sodium perfluorobutane sulfonate. Test samples of this mixture can be exposed to the flame for from 30-35 seconds.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. High molecular weight, thermoplastic polycarbonates having improved flame resistance which contain perfluoroalkane alkali metal sulphonates, tetraethylammonium perfluorobutane sulphonate, tetraethylammonium perfluoromethylbutane sulphonate or mixtures thereof.

2. The high molecular weight, thermoplastic polycarbonates of claim 1 which contain from 0.01 to about 1 percent by weight based on the weight of the polycarbonate of the perfluoroalkane alkali metal sulphonates, tetra ethylammonium perfluorobutane sulphonate, tetraethylammonium perfluoromethylbutane sulphonate or mixtures thereof.

3. The high molecular weight, thermoplastic polycarbonates of claim 1 which contain halogen atoms as a component of the polymeric structure.

4. The high molecular weight, thermoplastic polycarbonates of claim 1 wherein the perfluoroalkane alkali metal sulphonates are selected from the group consisting of sodium and potassium perfluorobutane sulphonate, sodium and potassium perfluorooctane sulphonate, sodium and potassium perfluoromethane sulfonate, sodium and potassium perfluoroethane sulfonate, sodium and potassium perfluoropropane sulfonate, sodium and potassium perfluorohexane sulfonate, sodium and potassium perfluoroheptane sulfonate.

5. The high molecular weight, thermoplastic polycarbonates of claim 1 wherein the polycarbonates are polycarbonates of divalent phenols.

References Cited
UNITED STATES PATENTS

| | | | |
|---|---|---|---|
| 2,732,398 | 1/1956 | Brice et al. | 260—503 |
| 3,535,300 | 10/1970 | Gable | 260—29.1 |
| 3,551,360 | 12/1970 | Dressler | 260—2.5 |
| 3,553,127 | 1/1971 | Warnock et al. | 252—5 |

DONALD E. CZAJA, Primary Examiner

R. A. WHITE, Assistant Examiner

U.S. Cl. X.R.

252—8.1; 260—45.7 S